Patented July 31, 1934

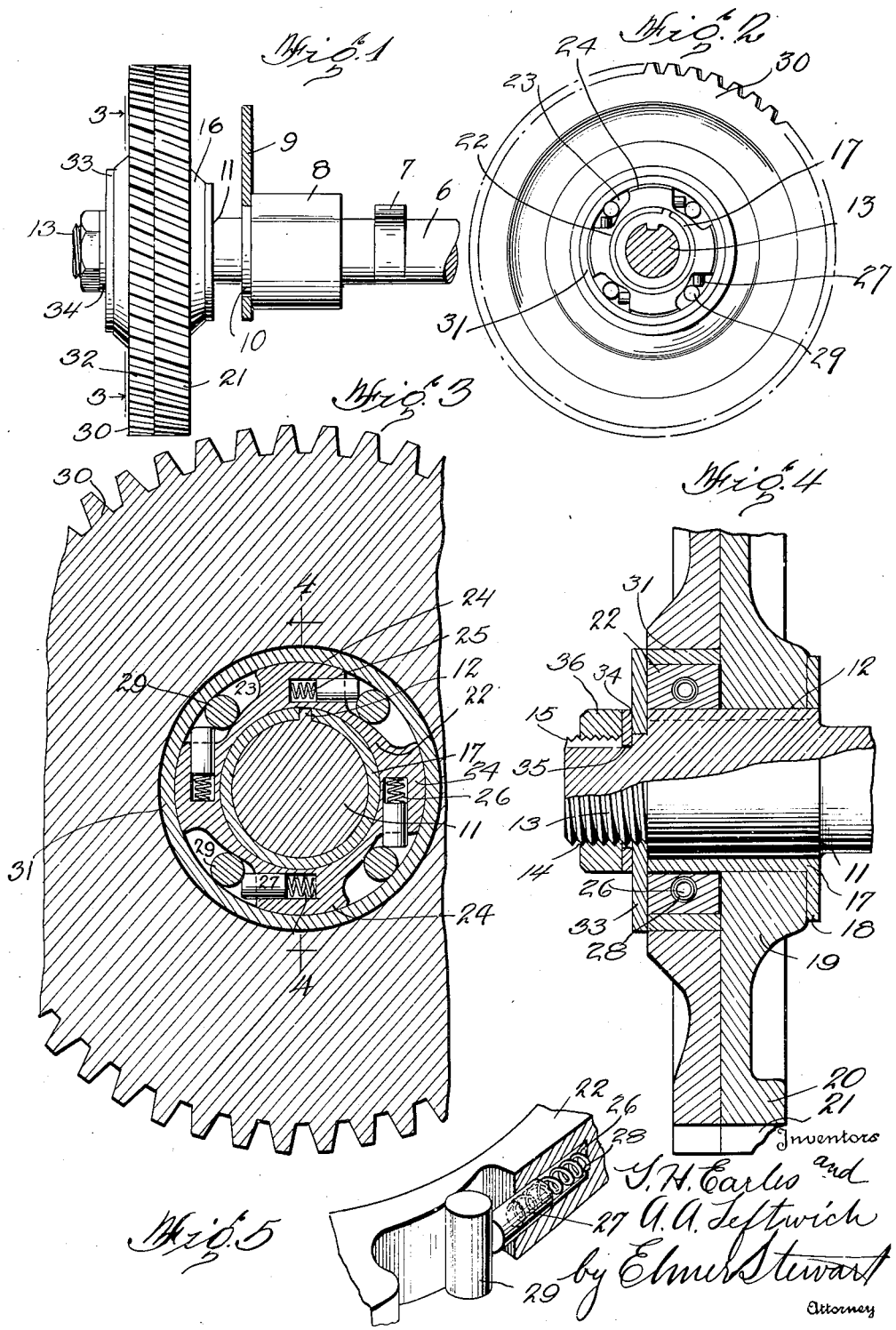

1,968,338

UNITED STATES PATENT OFFICE 1,968,338

ADJUSTABLE GEARING

Green H. Earles and Archer A. Leftwich, Cascade, Va.

Application June 22, 1933, Serial No. 677,120

8 Claims. (Cl. 74—440)

The invention to which the following description relates is in an improved gear especially adapted for use with a cam shaft. The gear has a special faculty of compensating for wear and preventing back-lash.

It is an object of our invention to provide means in this gear for automatically taking up the full space between the teeth of the pinion or other gear with which the device is used. In this way there is no appreciable amount of back-lash.

Another object of our invention is to provide an adjustment which will occur without any special seating and permit the adjusting mechanism to move freely around the gear in one direction to an unlimited extent.

Among the objects of our invention is the provision of means by which the adjustment is self-locking and permits backward movement of the adjusting gear in a very small degree so that there will be no binding and the gears are then firmly locked together.

Other objects of our invention will be readily apparent from the following description of the preferred form of our invention as shown in the accompanying drawing in which Fig. 1 is a side elevation of the improved gear assembled on the end of a cam shaft;

Fig. 2 is an end view of the same with the retaining ring and nut removed;

Fig. 3 is an enlarged transverse section on the line 3—3 of Fig. 1;

Fig. 4 is an enlarged longitudinal section on the line 4—4 of Fig. 3 and

Fig. 5 is an enlarged fragmentary perspective view of one of the braking assembly units.

By way of example of one form of our invention but without undue limitation thereto, we have shown one end of the usual cam shaft 6 as forming a part of the standard internal combustion engine. This shaft has a series of cams 7, one for each of the engine vlaves. A shaft bearing 8 is mounted in the engine block for holding the shaft in position and a thrust plate or end bracket 9 fits around a reduced portion 10 of the shaft.

Beyond the thrust plate or end member 9 the shaft 6 has a portion 11. As shown in Fig. 4 this end 11 is generally cylindrical but has a longitudinal key 12. The extreme end 13 of the shaft is of reduced diameter and is screw-threaded as shown at 14. This extreme end 13 also has a longitudinal key-way or slot 15 by which the mechanism on the shaft is held in position.

The gear 16 comprises a hub 17 which is in the form of a cylindrical bushing that fits over the keyed shaft portion 11. The hub 17 has a flange 18 at one end which extends outwardly from the shaft to the extent indicated generally in Fig. 4.

For the greater part of its length the hub 17 carries a wheel web 19 which may be of metal or of molded composition. The periphery of the web 19 is flanged as shown at 20 to provide a base for extended spiral teeth 21.

A shoulder collar 22 is fitted on the remaining extent of the bushing 17 as shown in Fig. 4. The collar 22 is firmly attached to the bushing 17 and forms with the latter a part of the main gear 16. The collar 22 serves with the flange 18 to maintain a seat for the web 19 of the main gear. If desired the collar 22 may form an integral portion of the bushing 17.

As indicated more clearly in Figs. 2 and 4 the collar 22 consists of a series of alternate chambers 23 and bosses 24. The chambers 23 have sloping bottom walls. The bosses 24 fill the space between the bushing 17 and the bushing of the supplemental gear which will be later described. The bushing 17 has a longitudinal key-way 25 which will accommodate the key 12 on the shaft portion 11.

Tangentially arranged within each of the bosses 24 is a socket 26 which opens up in the deeper wall of the adjoining chamber 23.

A hollow plunger 27 is fitted slidingly within each of the tangential sockets 26. The outer end of each plunger 27 is closed while the inner end is open and thus houses a spiral spring 28. One end of this spring abuts against the inner end of the socket 26.

A roller bearing 29 is fitted within each chamber 23. On one side the roller bearing is placed under tension by the spring pressed hollow plunger 27.

A supplemental ring gear 30 is formed with a hub or bushing 31 which fits slidingly around the bosses 24. The gear 30 is made of any suitable material such as metal or composition and its outer periphery has a series of spiral teeth 32 corresponding to or identical with teeth 21 on gear 16.

Outwardly of the supplemental ring gear 30 is a retaining ring 33 of sufficient diameter to extend over the bosses 24, the roller bearings 29 and the bushing 31 of the supplemental ring gear. This retaining ring serves the purposes of retaining lubricant, preventing the accumulation of dust and preventing the supplemental gear from moving axially with respect to the shaft and the main gear 16.

The ring 33 is held in place by means of a lock washer 34 having a detent 35 fitting within the slotted key-way 15. Outwardly of the washer 34 is a nut 36 by which the washer 34 and the retaining ring 33 are held in place.

From the above description it will be evident that the roller bearings 29 are carried in the chambers 23 and as a part of the main gear 16.

The supplemental ring gear 30 is free to rotate in one direction in an unlimited degree as the roller bearings operate as an overrunning clutch riding downwardly into the chambers 23 and compressing plungers 27 against springs 28. In any position in which the supplemental gear may rest, the plungers 27 bring the roller bearings into a snug fit between the bottom walls of chamber 23 and the bushing 31. Any slight movement of the supplemental ring gear 30 in the reverse direction establishes an increasingly firm engagement with the roller bearings and effectively locks the ring gear in position with respect to the main gear 16.

This improved gear receives power from the driving pinion or other gear while the engagement of the pinion with the main gear 20 may due to wear or improper adjustment permit slight relative movement, the inertia of the moving parts and the operative conditions permit relative rotation of the gears 20 and 30 so that the teeth 21 and 32 are brought into slightly off-set position as shown in Fig. 1.

The result is that each complementary pair of teeth 21 and 32 thus occupy the full space between the teeth on the driving pinion and any back-lash between the two gears is effectively prevented.

Due to the action of the overrunning clutch it is not necessary to seat the two gears in any definite relation when being installed as the supplemental gear will during operation travel to the desired extent for adjustment.

Any wear to which the gears may be subjected will only result in further slight adjustment of the gears and teeth and thus constantly compensate for changes in operative conditions.

The above improved gear is simple and rugged in construction and may be readily fitted as a replacement part on existing machines without special adjustment or skilled attention.

What we claim is:—

1. A gear comprising a hub, a disk having gear teeth on its periphery and being mounted on the hub, a collar on said hub and cooperating with the latter for holding the disk against rotation, a ring gear rotatable on the collar and having gear teeth on its periphery corresponding with those on the disk and means for preventing rotating movement of the ring gear on the collar in one direction.

2. A gear comprising a hub, a disk having gear teeth on its periphery and being mounted on the hub, a collar on said hub and cooperating with the latter for holding the disk against rotation, a ring gear rotatable on the collar and having gear teeth on its periphery corresponding with those on the disk and an over-running clutch engagement between the ring gear and the collar.

3. A gear comprising a hub, a disk having gear teeth on its periphery and being mounted on the hub, a collar on said hub and cooperating with the latter for holding the disk against rotation, a ring gear rotatable on the collar and having gear teeth on its periphery corresponding with those in the disk, a continuous bushing in the ring gear, cam tracks on the collar and means movable on the tracks for locking engagement with the bushing.

4. A gear comprising a hub, a disk having gear teeth on its periphery and being mounted on the hub, a collar on said hub and cooperating with the latter for holding the disk against rotation, a ring gear rotatable on the collar and having gear teeth on its periphery corresponding with those on the disk, a continuous bushing in the ring gear, cam tracks on the collar, rollers movable on the tracks and spring plungers for bringing the rollers into engagement with the tracks and bushing.

5. A gear comprising a hub, a disk having gear teeth on its periphery and being mounted on the hub, a collar on said hub and cooperating with the latter for holding the disk against rotation, a ring gear rotatable on the collar and having gear teeth on its periphery coincidental with those on the disk, a continuous bushing in the ring gear, bosses on the periphery of the collar on which bosses the bushing is journaled, inclined tracks intermediate the bosses, spring-pressed plungers held by the bosses for movement into the areas above the tracks, and rollers in the said areas for locking the collar and bushing.

6. A gear comprising a hub, a disk having gear teeth on its periphery and being mounted on the hub, a collar on said hub and cooperating with the latter for holding the disk against rotation, a ring gear rotatable on the collar and having gear teeth on its periphery corresponding with those on the disk, a continuous bushing in the ring gear, means engageable with the collar and bushing for preventing sliding movement of the ring gear on the collar in one direction and a cover plate revoluble with the hub and overlying the collar and bushing.

7. An intermediate gear for permanent engagement between a driving gear and a driven gear, said intermediate gear comprising a hub, a disk having spiral gear teeth on its periphery and being mounted on the hub, a collar on said hub and cooperating with the latter for holding the disk against rotation, a ring gear rotatable on the collar and having spiral gear teeth on its periphery normally corresponding to the teeth on the disk and means for preventing rotating movement of the ring gear on the collar in one direction.

8. A gear comprising a hub having a radially extending flange on one end, a toothed disk mounted on the hub, a collar on the hub and cooperating with the flange to hold the disk against displacement, a toothed ring gear rotatable on the collar, means for preventing rotating movement of the ring gear with respect to the collar in one direction and a second flange overlying the outer side of the collar and ring gear.

GREEN H. EARLES.
ARCHER A. LEFTWICH.